United States Patent [19]

Oetiker et al.

[11] Patent Number: 4,597,405

[45] Date of Patent: Jul. 1, 1986

[54] PROCESS AND APPARATUS FOR CONTROLLING A CONTROLLABLE MAGNITUDE AND USE OF THE PROCESS

[75] Inventors: Hans Oetiker, St. Gallen; Emanuel Kummer, Gossau, both of Switzerland

[73] Assignee: Gebruder Buhler AG, Uzwil, Switzerland

[21] Appl. No.: 568,208

[22] PCT Filed: Mar. 16, 1983

[86] PCT No.: PCT/EP83/00078

§ 371 Date: Oct. 18, 1983

§ 102(e) Date: Oct. 18, 1983

[87] PCT Pub. No.: WO83/03315

PCT Pub. Date: Sep. 29, 1983

[30] Foreign Application Priority Data

Mar. 16, 1982 [DE] Fed. Rep. of Germany ....... 3209494
Mar. 15, 1983 [EP] European Pat. Off. ........ 83102532.5

[51] Int. Cl.$^4$ ............................................. G05D 16/00
[52] U.S. Cl. ..................................... 137/14; 137/85; 137/487.5
[58] Field of Search ................... 137/1, 14, 487.5, 85; 91/429

[56] References Cited

U.S. PATENT DOCUMENTS

3,462,115 8/1969 Barker ............................. 91/429 X
4,481,768 11/1984 Goshorn ......................... 91/429 X Primary Examiner—Alan Cohan

[57] ABSTRACT

FIG. 2 illustrates a process and an apparatus for controlling a controllable magnitude as well as the use of the process, especially for controlling the throughput of pourable or flowable material (grain or water) in a flour mill. In this connection, a servo drive, constructed as a fluidic pressure drive (5', V'), is provided for controlling a servo element. The deviation, measured by a comparator (1'), is supplied to a discriminator (10), which then gives off a first discrimination signal ($+U_F$, $-U_F$) when the deviation has reached a first (lower) or second (upper) threshold value, the two threshold values lying within a range of small deviations about zero. In this range of small deviations, the pressure drive (5') is acted upon by transient micropressures (rapid pressure fluctuations with small peak values), the reversal points of the microfluctuations depending on the two aforementioned threshold values. For this, a control input of the pressure drive (5') is assigned to the discriminator, which has been provided for giving off the first discrimination signal.

24 Claims, 10 Drawing Figures

PROCESS AND APPARATUS FOR CONTROLLING A CONTROLLABLE MAGNITUDE AND USE OF THE PROCESS

TECHNICAL FIELD

The invention relates to a process for controlling a controllable magnitude using a control circuit, whose servo drive is designed as a fluidic pressure drive, especially for controlling the throughput of pourable or fluid material through a material feed line in a flour mill plant.

The invention moreover relates to an apparatus for controlling a controllable magnitude with a set-point adjuster, an instantaneous value sensor, a comparator/-controller unit having a discriminator and a servo unit (servo drive and servo element), which is downstream from the above elements and whose servo drive is designed as a fluidic pressure drive.

UNDERLYING STATE OF THE ART

The aforementioned process, as well as the aforementioned apparatus are known from the German Auslegeschrift No. 2,223,476 of Jan. 2, 1976 (Sampson Apparatebau AG). In the known apparatus, the servo component, that is the servo drive and the servo element, which is driven by the automatic control output, has a pneumatically operated diaphragm chamber (servo drive) and a discharge valve (servo element), which is operated by the diaphragm chamber. The known control apparatus is designed as a three-point controller. Its comparator/controller unit therefore differentiates only between three states of deviations, that is, values of the difference between the instantaneous value and the set point: namely, (i) the deviation is greater than zero; (ii) the deviation is less than zero; and (iii) the deviation is equal to zero. Since the known controller/comparator unit is in a position to differentiate between the three aforementioned states of deviation, the unit, intended for this differentiation, could also be considered as a discriminator. As for the rest, the teachings, known from the aforementioned Auslegeschrift, are concerned with the problem of simplifying the feedback, which affects the switching interval of the controller. According to the known teachings, this problem is solved owing to the fact that the time behavior of the feedback is adjustable with the help of chokes. The teachings, known from the aforementioned German Auslegeschrift, are not concerned with the problem of providing as accurate a control as possible and especially not with the problem of providing accurate control of the throughput of pourable or fluid material through a material feed line in a flour mill. This problem, which is not treated in the aforementioned publication, is however a central problem of any control system. It is particularly important for metering streams of material which flow continuously, for example, water or grain in a flour mill, because control of the throughput of pourable and fluid materials in the flour mill continues to be one of the critical interfaces between the well-known mechanical parts of the plant and modern means of control.

DISLCOSURE OF THE INVENTION

The inventive teachings start out from the objective of developing further a process as well as apparatus of the aforementioned type, so that the controllable magnitude can be controlled as accurately as possible. In particular, the aforementioned process, as well as the aforementioned control apparatus are to be developed further for as accurate a control as possible of a continuous throughput of pourable or fluid materials.

This objective is accomplished for the process owing to the fact that the fluid in the pressure drive is acted upon in the range of small deviations by transient micropressures (rapid transient pressures or pressure fluctuations with small peak values), the reversal points of the transient micropressures being determined essentially by two (a first and a second) threshold values lying in the range of small deviations.

This objective is accomplished for the control apparatus owing to the fact that the discriminator is so designed, that it emits a first discrimination signal when the deviations, measured by the comparator section of the comparator/controller unit, lie between two (a first and a second) threshold values within a preset first range about zero (range of small deviations), and a control input of the fluidic pressure drive is connected with the discriminator output, which is provided for emitting the first discrimination signal, and this control input is designed for acting upon the pressure drive with transient micropressures (rapid transient pressures with small peak values) when triggered by the first discrimination signal.

The action of transient micropressures of the fluidic pressure drive, which is undertaken in the range of small pressure deviations, leads to continuous fluid pressure changes in the pressure drive. Since initiation of the transient micropressures, especially the reversal points of the transient pressures, depends or depend, inter alia, on the preset first and second threshold values lying in the range of small deviations and in this respect are or can be dependent on the instantaneous value, neither a frequency nor, in the stricter sense, an amplitude, that is neither a constant number of reversal points per unit time nor constant peak pressure values, in other words the constant parameters characteristic of oscillations, can be assigned to the transient micropressures. For this reason, instead of the terms "pressure oscillations", "frequency" and "amplitude", the terms "transient pressures", "average fluctuation frequency" and "peak value" have been selected.

Experiments, carried out by the applicant, have shown that, on the basis of the introduction of transient micropressures in the fluidic pressure drive, which is atypical, as such, for control circuits, it was possible to attain unexpectedly high control accuracy, as well as good visibility at a glance and guidance of the whole control process—and this even under the extremely rough control conditions of a flour mill. In general, it would have been expected that the resonant increase of oscillations, which is well-known and feared from its occurrence in fluidic systems of continuous control systems, would have occurred to an increasing extent due to the initiation of transient micropressures in the fluidic pressure drive. The opposite was the case.

It is known from the German Offenlegungsschrift DE No. 30 37 335 A 1 of May 14, 1981 (Aktiebolaget Bofors) that, for increasing the linearity and amplifying small signals in a servo system, especially for a tracker, a so-called "jitter signal" may be superimposed over the control signal of the servo system and the frequency of the jitter signal selected so that it is approximately equal to or slightly above the upper frequency limit of the servo system. In accordance with these known teachings, small inaccuracies, such as, for example, nonlinearity, slackness, friction, hysteresis phenomena, etc. are avoided by such a procedure. Alternatively, according to the given teachings, this jitter signal can also be impressed on the instantaneous value signal. In each case, this jitter signal has a fixed, preset frequency and a fixed, preset amplitude and is therefore a true oscillation which, in particular, is completely independent of the instantaneous value signal. For example, this jitter signal is produced by a(n) (electronic) jitter oscillator, which is fixed at a frequency of 8 Hz. Moreover, the teachings, known from the aforementioned DE No. 20 37 335 A 1, do not address the problems of pneumatic or fluidic control systems, especially not those of a fluidic servo drive. However, as already mentioned, it is well known that fluidic control systems are particularly exposed to the danger that fluid-system will develop resonant increases in oscillations.

In principle, the impression of transient micropressures on the fluid in the pressure drive can be accomplished according to any process or by means of any equipment suitable for this purpose, for example, by an arrangement for changing the internal volume of the pressure drive. However, transient micropressures are preferably impressed on the fluidic pressure drive by alternately introducing and carrying away small fluid flows; the transient micropressures are therefore initiated with the help of pneumatic output signals. For this purpose and according to a preferred embodiment of the process, a—in comparison with the total amount of fluid in the pressure drive slight—first fluid microflow is continuously introduced into the pressure drive, that is, independently of the particular deviation. The direction of the microchanges in pressure, brought about by this in the range of small deviations, is now alternately reversed by additionally commencing to discharge from the pressure drive a second microflow of fluid which also is small but larger than the first fluid flow, as soon as the deviation has reached a first (upper) threshold value, which lies within the (first) range of small deviations. Since the second fluid microflow, discharged from the pressure drive, is greater than the first fluid microflow, introduced into the pressure drive, a resultant fluid flow out of the pressure drive arises from superimposing these two microflows of fluid. The pressure in the pressure drive accordingly drops. As soon as the deviation has fallen to a second (lower) threshold value, which also lies within the (first) range of small deviations, the discharge of the second fluid microflow from the pressure drive is terminated. Since once again now only the first fluid microflow is being introduced into the pressure drive, the pressure in the pressure drive rises once again or the deviation is returned to the value zero and then increased again until it once more has reached the first (upper) threshold value. This process is repeated continuously within the range of small deviations. This type of pneumatic control enables known means to be employed for controlling fluid flows. Moreover, the transient micropressures have a constant magnitude if the pressure change per unti time in the fluidic pressure drive, that is, the rate of pressure change, is essentially constant when the first fluid microflow as well as the fluid microflow, resulting from the superimposition of the first and second fluid microflows, are impressed on the pressure drive. In this connection, the regions in which the direction of the pressure change is reversed, that is the regions of the respective peak pressure values of the transient micropressure form an exception.

In accordance with a further preferred form of the process, the aforementioned process variant can also be reversed insofar as a first fluid microflow, small in comparison to the total amount of fluid in the pressure drive, is continuously discharged from the pressure drive and the direction of microchange in pressure, produced in the pressure drive by so doing, is alternately reversed in the range of small deviations owing to the fact that a second fluid microflow, which is also small but larger than the first fluid flow, is additionally introduced into the pressure drive, whenever the deviation has reached a second (lower) threshold value lying within the (first) range of small deviations, the influx of the second fluid microflow being maintained until the deviation has risen to a first (upper) threshold value, which also lies within the (first) range of small deviations. This manner of conducting the process essentially has the same advantages as the aforementioned process variant. In particular, the transient micropressures can—as in the aforementioned process variant—be controlled owing to the fact that only the fluid influx—the fluid discharge in the aforementioned variant—is controlled independently of the instantaneous value.

In accordance with a further preferred embodiment of the invention, the action of transient micropressures on the fluid in the pressure drive can alternatively be brought about in the range of small deviations owing to the fact that a fluid microflow, small in comparison to the total amount of fluid in the pressure drive, is alternately introduced into and discharged again from the pressure drive, the direction of this fluid microflow being reversed whenever the deviation has reached the first (upper) or the second (lower) threshold value within the (first) range of small deviations. Accordingly, in this embodiment of the process, a fluid microflow is not supplied to or discharged continuously, that is, independently of the deviations, from the pressure drive. In particular, the effects of two opposing fluid microflows are not superimposed here. This process variant has the particular advantage that fluid microflows of equal magnitude can also be used.

In order to implement the three process variants described above, the control input, designed for acting upon the pressure drive with transient micropressures, has an electrically controlled arrangement for fluid influx into or discharge from the pressure drive, the effective flow cross section of the fluid influx/discharge device being so small, that the fluid flow, passed by the cross section, affects the pressure only slightly.

Preferably, the electrically controlled fluid influx/discharge device has an electro-pneumatic control valve, which preferably is designed as a three-way valve and especially as a three-way diaphragm valve for implementing the process.

The effective flow cross sections of the fluid influx/discharge device, provided for introducing transient micropressures, are preferably of different sizes for implementing the above-mentioned three process variants. In order to implement the first two process variants, the fluid influx/discharge device is so designed, that the smaller flow cross section is permanently open while the larger flow cross section is open only when triggered by a first threshold switch of the discriminator, the first threshold switch in turn being so connected, that it gives off a control signal to the fluid influx/discharge device when the deviation has reached a first—or instead a second—threshold value within the (first) range of small deviations.

In this connection, the fluid influx/discharge device may have a only two-way valve and an additional throttle valve 6 instead of the three-way valve, the throttle valve having the smaller effective flow cross section.

In accordance with a particularly preferred embodiment of the process, the deriving and processing of the signal, which is carried out between the measurement output of the instantaneous value sensor and the output of the comparator/controller unit, is implemented electrically/electronically. Especially suitable for this purpose are a set-point adjuster, an instantaneous value sensor and a comparator/controller unit, including the discriminator, which are designed as electrical/electronic signal derivation/processing elements.

Some general comments appear to be appropriate here. Controls systems can be divided into two functional units. In principle, the first unit processes informational or nondissipative signals. The second unit is concerned with the actual power control. For this purpose, a driving signal must be produced, which is capable of moving (holding in position or (rapidly) changing butterfly valves, slide valves, etc. in a controlling manner and to do this independently of temporary interference, for example, due to undesirable frictional relationships. The power control frequently demands a large force and a rapid reaction. Until now, it had always been thought that the rapid application of large forces can be accomplished only by way of elements with a correspondingly large cross section. In actual fact however, this consideration does not apply, at least not when the driving signals and the forces corresponding to these are produced and transferred by fluid means. This is the case also when the fluidic and especially the pneumatic driving signals are transferred over considerable distances, for example, with the help of plastic hoses. The miniaturization of pneumatic control elements does not result in a miniaturization of forces, as it does in mechanics or in electrical engineering. On the contrary, the forces can be kept at the same magnitude. Miniaturization of pneumatic elements for transferring power reduces only the work per unit time, that is, the output. A miniature pneumatic valve can be operated with $0.5 \times 10^5$ N/m² (0.5 bar) compressed air in exactly the same manner as a large pneumatic valve. The best control is however achieved not with a unit which moves a servo drive or a servo element with the highest possible power, but with one which undertakes a correction of the deviation with the least possible work in exactly the right direction. Possibly the oscillations of the fluid, that is, the resonant increase of oscillations in the fluid system, which previously has been observed and feared time and again in fluidic control systems, is attributable to the use of driving signals which are too high. The invention now makes a virtue of the previous necessity. The fluidic pressure drive is deliberately acted upon continuously by transient micropressures, and moreover with the help of fluid microflows, which are controlled over appropriately miniaturized pneumatic valves.

As already mentioned in the above example of the operation, a control system, comprising a combination of electric/electronic components followed by fluidic components, is also used in accordance with the invention. The interfaces between the electric/electronic components and the fluidic components are in this case placed at points of the control system where, for the first time, driving signals are actually required. The electric/electronic components, which preferably are operated with D.C. current or voltage, ensure high accuracy of the information signals. Some of the advantages of pneumatic elements for producing and transferring driving signals have already been discussed. There are further advantages in addition. For example, the use of the inventive control system in a flour mill has the advantage that the parts, which intervene in elements of the plant so as to control them, need not be supplied with electricity. Supplying electricity to servo components frequently leads to a high risk of explosion in the flour mill, since flour dust frequently is very explosive. Particularly advantageous is the use of the diaphragm valve, which has already been referred to and which is very small, corresponding to the fluid microflow it controls. For example, the bore of the valve is 1 mm or less, for example $\pi/4$. The mass of the diaphragm body is also very small. The valve plate of the diaphragm valve is preferably constructed as a spring. As a result, there is no friction-affected motion—apart from internal motion of the spring (or motion within the spring steel)—when the direction of the three-way diaphragm valve is changed. From an industrial point of view, the service life of such a valve is practically unlimited. Since the diaphragm—or a corresponding diaphragm-like anchor—travels only a very small distance in this miniature or fine valve, a very high rate of switching sequences can be achieved. In this connection, it should also be noted that the three-way valve switches back and forth essentially only between two discrete, in this respect digital switching states. The following may be noted when this membrane valve is compared with a conventional, commercial electromagnetic valve with a service life limited to 10 years by pure aging phenomena. It has been the experience of the applicant that, in respect to wear and tear, etc., the service life of such electromagnetic valves is of the order of 20,000,000 switching operations at most; this under normal conditions. If now a valve is switched once per second, there are between 20,000,000 and 30,000,000 switching operations per year. The service life of the said conventional, commercial electromagnetic valves, continuously operated at a switching frequency of about 1 Hz, is one year at most.

In plant construction, especially of flour mills, the customer expects an average service life of at least 10 years. Moreover, many flour mills are built close to the ocean. Experience has shown that the service life in these areas is reduced because of the salt-containing, moist air. For a wear-limited service life of 10 years, a valve, switched once per second, would have to withstand 200,000,000 to 300,000,000 switching operations per second under normal conditions. An endurance tests, carried out by the applicant, has shown that fine diaphragm valve, used for controlling fluid microflows, has already passed several billion or trillion, that is, more than $10^9$ switching operations and is still operating perfectly.

Preferably, an an average switching frequency of 1 to 50 and especially 5 to 20 switching operations are used for a normal mill output, for example, for continuously controlling the dosage rate of a falling stream of grain or the dosage rate of water supplied to the grain. This corresponds to an average fluctuation frequency of the transient micropressure of 1 to 50 and preferably 5 to 20 fluctuations per second.

In accordance with a further preferred process variant, the inventive process is carried out using an electronic discriminator, which divides the deviations in a known manner into at least three ranges. These ranges are the already discussed range of small deviations, also referred to as fine range or first range, as well as two coarse ranges, lying symmetrically about the first range and also referred to as second and third range. The additional division of the range of deviations into the two coarse ranges is made known by the discriminator owing to the fact that the discriminator delivers a coarse signal for the second range, namely a second coarse signal, and a further coarse signal for the third range, namely a third coarse signal. The coarse signals or coarse ranges correspond to deviations, which lie outside the fine range and therefore are larger deviations. In this variant of the process, the fluid flow for raising or lowering the pressure in the pressure drive is so adjusted or selected, that, in the range of small deviations when neither the second nor the third coarse signal is present, it essentially assumes only two discrete, in this respect digitalized values. On the other hand, if the deviation is in the coarse range, a value proportional to the deviation is selected for the fluid flow required to raise or lower the pressure. In other words, for large deviations the servo drive moves the servo element proportionally to the magnitude of the deviations.

For carrying out this process, the control apparatus preferably has a window discriminator, which, in the case of large deviations, delivers the already described coarse discrimination signals, an electrically controlled, coarse fluidic inlet valve as well as an electrically controlled, coarse fluidic discharge valve being additionally provided for supplying or discharging fluid to or from the pressure drive respectively. Each control input of each coarse valve is assigned to or connected with one of the coarse discrimination signal outputs. In this connection, the coarse valves are so designed, that their flow cross section is controllable in proportion to the deviation. The fine valve device, that is, the fluid influx/discharge device, which is provided for acting on the pressure drive with transient micropressures, is so designed here that, in respect to its effective flow cross section, it is essentially reversible between two discrete values. This combination between proportional control or correction of the deviation on the one hand and between a correction of the deviation which oscillates back and forth between two values, makes optimum control possible under practical control conditions, especially in a milling plant. The control system can be used in this way for controlling controllable magnitudes with deviations of any size. If the deviation is large, the controller or the discriminator give a servo command to the coarse valve to move the servo element rapidly by means of the servo drive into the range of small deviations. Once this range is reached, the coarse valve is shut off and the action of transient micropressures on the servo drive, in this case the pressure drive, is commenced. On the other hand, if only coarse valves were used for the control, a resonant increase of oscillations in the control circuit would be unavoidable and therefore the objective of good metering would not be achievable.

It is admittedly known from the German Auslegeschrift No. 1,763,151 of Mar. 23, 1971 (Messerschmitt-Bölkow-Blohm GmbH) that a two-point controller may be provided with a, preferably fluidic, discriminator which divides deviations into a coarse range and a fine range. With the known two-point controller however, basically the same principle is employed for all ranges of control; in particular, no transient pressures or transient micropressures are introduced into the control system for any of the ranges. Moreover, the previously known two-point controller does not have a fluidic servo drive. As for the test, the previously known teachings are concerned with the objective of providing a two-point controller which, while keeping the circuit complexity as simple as possible, enables the deviation occurring to be returned with approximately optimum speed to the zero value, no additional extension times being introduced, especially not in the case of smaller deviations. In order to accomplish this objective, the step widths of the discriminator are selected so that their values satisfy a special mathematical function and have fixed reversal limits, at which an inversion of the servo command or servo magnitude takes place.

In accordance with a further preferred embodiment of the invention, the device for acting upon the servo drive by means of transient micropressures on the one hand, and the coarse valves on the other are connected fluidically in parallel, so that they supplement each other reciprocally when a fluid microflow is either supplied continuously to or discharged continuously from the servo drive, that is, also in the coarse ranges.

Preferably, in order to be able to set the flow cross section for the coarse valve to the maximum value from the start, an adjustable coarse restrictor is connected between the fluidic pressure drive on the one hand and the control valves on the other.

A fine restrictor, connected in the path of the fluid microflow, serves a corresponding purpose. At least one of the two discrete values for the fluid microflow can be preselected arbitrarily with this fine restrictor.

The invention also comprises the use of the claimed process for continuously controlling the dosage rate of a falling stream of grain and/or the supply of water to grain in a flour mill.

The invention is explained in greater detail below by means of forms of construction, reference being made to the attached schematic drawings.

WAYS OF IMPLEMENTING THE INVENTION

In the description of the Figures, the same reference symbols are used for parts which are functionally equivalent within the meaning of the invention. Modifications of these functionally equivalent parts are identified in the various forms of construction by raised lines (') next to the corresponding reference symbols. Further expalanations of the schematic representations in FIGS. 1 to 6 are as follows: Straight lines represent electrical information signal lines, simple wavy lines represent pneumatic information signal lines and double wavy lines represent pneumatic output signal lines.

Figure 1:
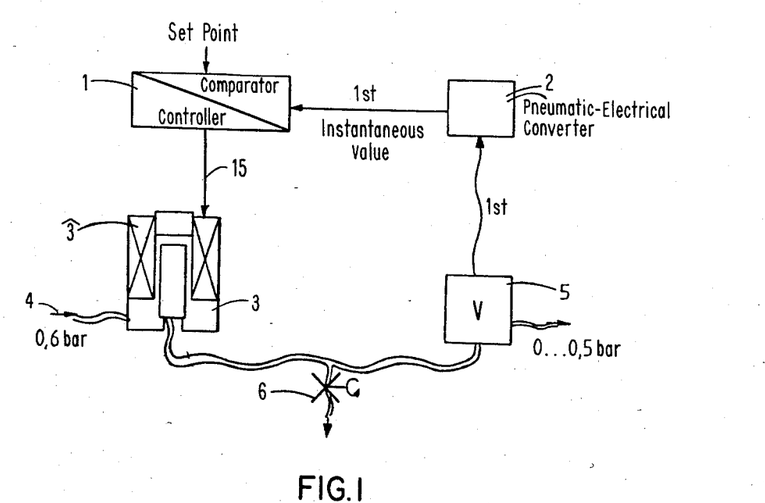
FIG. 1 is a simplified schematic representation of an essential detail of a first form of construction of the invention.

FIG. 1 schematically shows an essential detail of a form of construction of the inventive control circuit. For the sake of simplicity, the comparator and controller have been combined here into a controller/comparator unit 1. Of the servo component—this usually comprises the servo drive or motor and the servo element (e.g. sliding valve, butterfly valve, etc.) actuated by the servo drive—only the servo drive 5 is shown. Within the scope of the present invention, it is designed as a fluidic pressure drive or as a pneumatic consuming device V. The pneumatic consuming device V is to use only a small amount of air here. In order to simplify the drawing, the instantaneous value signal "1st" is brought out of the consuming device V in FIG. 1 although, in an actual realization, it is usually measured by a separate instantaneous valve sensor, which is mounted in advance of the control system (see 2" in FIG. 5).

The comparator/controller unit 1 works electrically or electronically. Accordingly. it, or more accurately its comparator portion, is provided with electrical set-point and instantaneous-value signals, in each case from a (not shown) set point adjuster and from a pneumatic-electric convertor 2. In the example of the operation shown, the set-point and instantaneous-value signals are present in the form of D.C. voltages. They can have values from 0 to 10 volts. Over lead 15, the controller drives an electro-pneumatic fine valve 3, and moreover over its magnet coil 3, in proportion to the deviation of the instantaneous value from the set point, which is referred to as deviation in the following. The fine valve 3 is constructed as a 2-way valve here, which is closed in the absence of flow and, when the magnet coil 3 is excited, is transformed into the open state. It connects a pneumatic feed line 4 with a fine pneumatic feed pipe 24. The fine pneumatic feed pipe 24 is directly connected with the fluidic pressure drive 5. The pneumatic supply of the servo drive 5 can accordingly be controlled with fine valve 3, which can therefore be regarded as the control input of the servo drive. A fine discharge restrictor 6, whose flow cross section can be adjusted, is connected between fine valve 3 and servo drive 5.

The word component "fine" in the aforementioned elements, namely fine valve 3, fine feed pipe 24 and fine discharge restrictor 6 means that only small amounts of air are transported or pressures are transferred through said elements.

In the example of the operation shown, it is essential that a small amount of air is constantly discharged through the fine discharge restrictor 6. The amount of air, discharging from fine discharge restrictor 6, is however less than the amount of air, which can be supplied through fine valve 3. The combined action of fine discharge restrictor 6 and fine valve 3 enables the drive direction of the servo drive 5, acting on the servo element, and the pressure relationships, existing in servo drive 5, to be continuously changed alternately.

Instead of using a 2-way fine valve in conjunction with the fine discharge restrictor 6 as described, it is also possible to chose a 3-way valve. This variant has the advantage of more symmetrical flow relationships and a more universal application in control systems.

The detail of the control circuit, shown schematically in FIG. 1, operates as follows. The controller/comparator unit controls the magnet coil 3 in the sense of an excitation or holds control valve 3 open, until the deviation has reached a first threshold value $+U_F$ (see FIG. 3). This threshold value lies within a first range of small deviations, limited by two additional threshold values $U_E$ and $U_A$, referred to in the following as third and fourth threshold values, that is, within a range in which the deviation is almost zero. Fine valve 3 is closed when this first threshold value $U_F$ is reached. Fine discharge restrictor 6 however remains open as before, so that the instantaneous value once again falls below the set-point, and moreover until a given lower threshold value $-U_F$ for the deviation is reached. When this threshold value is reached, magnet coil 3 is once again driven in the sense of an excitation by controller/comparator unit 1. This process is repeated continuously.

In the absence of disturbances—which is not the case in reality—microoscillations in pressure would be impressed on servo drive 5, whose frequency is determined essentially by the distance between the first and second threshold values $+U_F$ and $-U_F$, as well as by the flow cross sections of fine valve 3 and of fine discharge restrictor 6. Since disturbances (of unknown magnitude and direction), which constantly change the instantaneous value signal, always arise in reality, the aforementioned microoscillations in pressure are "deformed" into microfluctuations in pressure or transient micropressures which—in contrast to (pure) microoscillations in pressure—do not usually have a constant, foreseeable freuency, nor a constant, foreseeable amplitude. The advantages of this type of control are explained next by means of FIG. 3.

Figure 2:
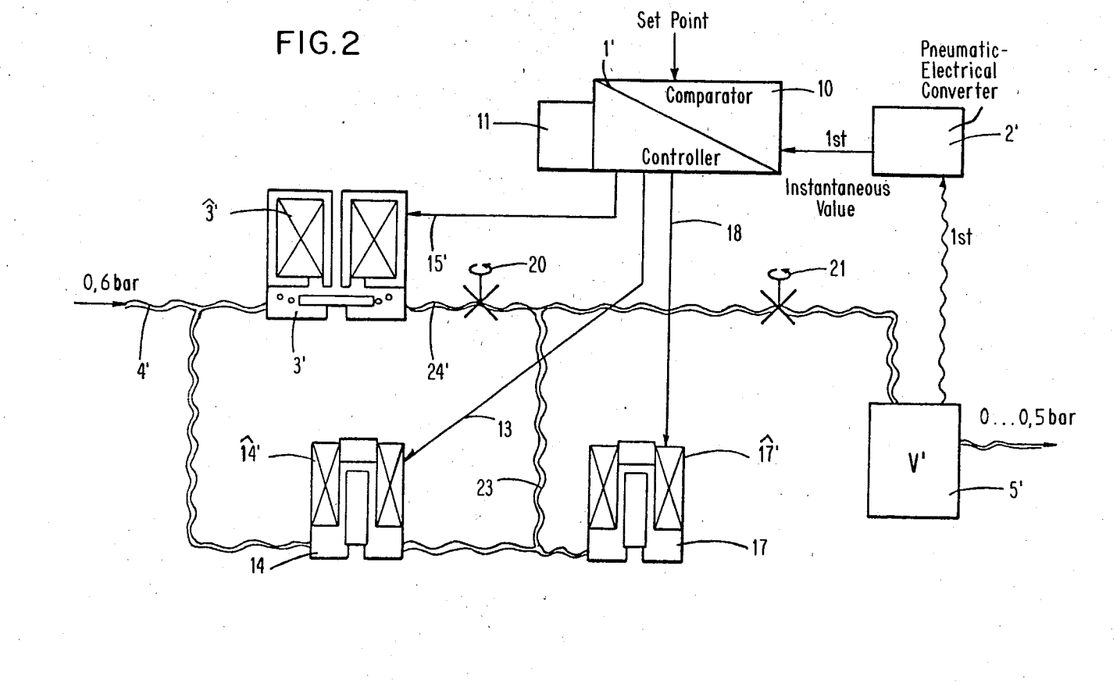
FIG. 2 is a simplified schematic representation of a further form of construction of the invention.

An improvement of the principle explained by means of FIG. 1 for controlling a controllable magnitude, is shown in FIG. 2. The example of the operation, shown in FIG. 2, differs from the example of the operation, shown in FIG. 1, essentially owing to the fact that a coarse inlet valve 14, a coarse discharge valve 17 and a window discriminator 10 are provided. Larger deviations can also be mastered well with the help of these elements. Window discriminator 10 is constructed in such a way, that it can differentiate between three ranges of deviations, namely the already mentioned first range of small deviations, also referred to in the following as "fine range", a second and a third range, each referred to in the following as "coarse range", in which the deviations in each case lie outside of the fine range. The two coarse ranges adjoin the fine range on either side, and are separated from the latter by third and fouth threshold values $U_E$ and $U_A$.

Figure 5:
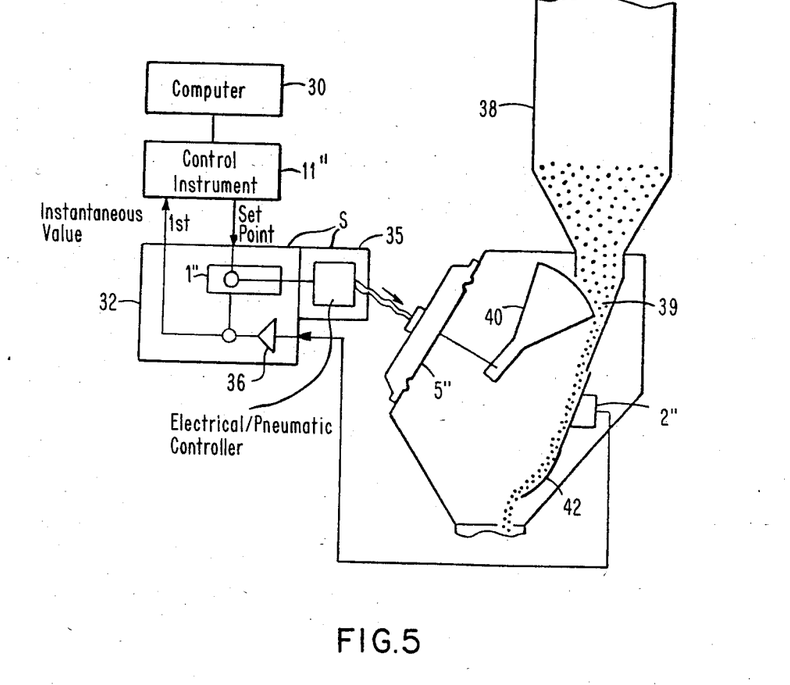

In this example of the operation, the set-value can also be preset from anywhere, for example, from a computer or from a control instrument 11 (see FIG. 5). In the example of the operation shown, the control instrument is coupled directly to a controller/comparator unit 1'. The controller/comparator unit 1' once again receives the instantaneous value from a pneumatic-electric convertor 2'.

There is such a deviation in the second (coarse) range, that a large amount of air must be supplied in a short time to servo drive 5' or consuming device V'. For this purpose, magnet coil 14 of coarse inlet valve 14 is driven in the sense of an excitation over lead 13 by window discriminator 10. As a result, coarse inlet valve 14 is opened, so that a comparatively large amount of air is supplied to servo drive 5' over feed pipe 4' and coarse feed/discharge pipe 23. In the example of the operation shown, magnet coil 3' of fine valve 3' is simultaneously acted upon by way of lead 15' by an excitation signal, so that a microflow of compressed air is supplied simultaneously to servo drive 5'.

When the deviation reaches the third threshold value $U_E$, which is designated for the transition from the second (coarse) range to the fine range, coarse inlet valve 14, which is constructed as a 2-way valve, is closed. As soon as coarse inlet valve 14 is closed, only fine valve 3' is operating. In this example of the operation, fine valve 3' is constructed as a 3-way valve and is so connected, that it reverses the direction of the microflow of fluid when the first threshold value $+U_F$, lying within the fine range, is reached and therefore permits a small amount of compressed air to flow out of servo drive 5'. When the second threshold value $-U_F$ is reached, the direction of the microflow of fluid is reversed once more. Moreover, an adjustable fine restrictor 20 is provided in the fine supply pipe 24', with the help of which the effective flow cross section in fine supply pipe 24' can be changed.

On the other hand, if the deviation lies in the third (coarse) region and a large amount of air must rapidly be discharged from the servo drive 5', then magnet coil 17 of coarse discharge valve 17 is driven appropriately over lead 18. By these means, the pressure in the consuming device or servo drive 5' is rapidly reduced and moreover until the deviation has reached the fourth specified threshold value $U_A$, which has been fixed for this transition from the coarse range to the fine range.

It is very advantageous for practical operations if the window discriminator 10 is so designed, that its three discrimination ranges are adjustable and moreover if an adjustable coarse restrictor 21, with the help of which the effective cross section of coarse flows through coarse valves 14 and 17 is changeable, is connected between servo drive 5' and the valves, including fine restrictor 20.

In the example of the operation shown, coarse inlet valve 14 and fine valve 3' are connected in parallel. Their action is therefore additive when both are opened in the direction of supplying air to servo drive 5'. Coarse discharge valve 17 is also connected in parallel with fine valve 3'. The effects of these two valves are also additive therefore, when both are driven in the direction of discharging air from consuming device 5'.

Figure 3:
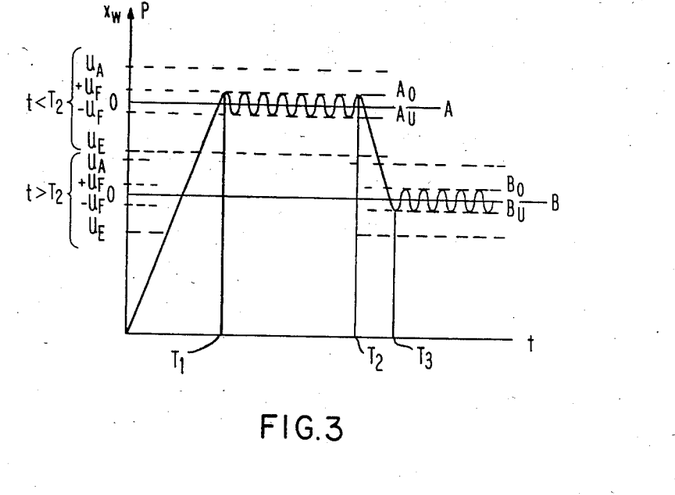
FIGS. 3, 3A, and 3B are graphic representations for explaining the course of the pressure in the pressure drive and the deviation.
Figure 3A:
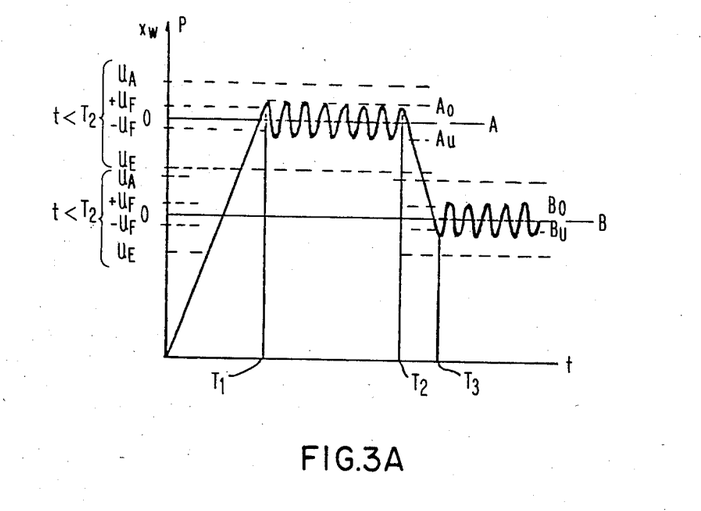
Figure 3B:
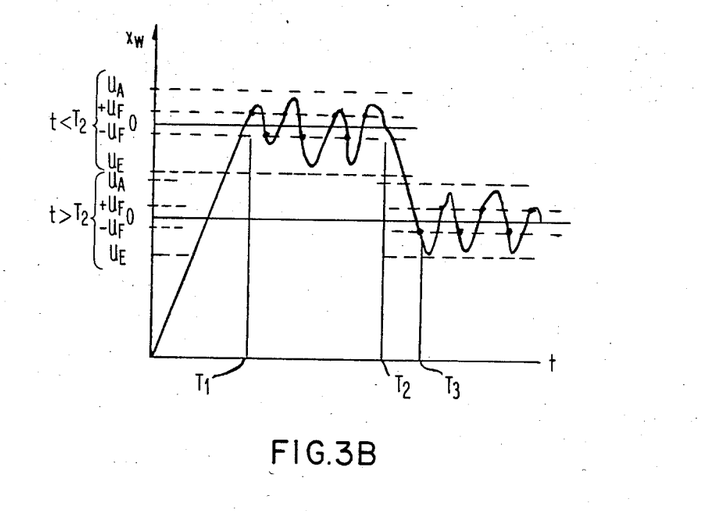

The pressure P in comsuming device V' or servo drive 5' for the control apparatus of FIG. 2 is plotted schematically as a function of time t in FIG. 3. For the purpose of a simple graphical illustration of the inventive control principle, it is assumed here that initially no disturbances interfere with the control process, that is, change the instantaneous value, and that the control apparatus reacts without delay to a change in the direction of the microflow of fluid. The control apparatus is now switched on at time t=0. Since there is no compressed air in the consuming device V' or servo drive 5', coarse valve 14 is driven or opened immediately because of the large deviation $x_w$. After a short time, for example after one second, the deviation has reached the lowest, that is, third threshold value $U_E$ and the pressure has risen to a corresponding value. The deviation has now become so small, that it lies in the fine range and coarse inlet valve 14 is closed once again. Fine valve 3', which was opened simultaneously with coarse inlet valve 14 in the example of the operation shown, now acts alone. As soon as the deviation has reached the first threshold value $+U_F$ or the pressure has risen to the value $A_o$ (top)—this at time $T_1$—fine valve 3' is reversed. Since fine valve 3' is a 3-way valve in this example of the operation, only the air discharge channel of the valve is opened by this reversal. Air now flows out of consuming device V'. When the lower pressure point $A_u$ in servo drive 5' or the second threshold value $-U_F$ within the fine range is reached, fine valve 3' is once again reversed, that is, it is opened once again. This reversal process is repeated continuously, and moreover as long as the deviation $x_w$ remains within the fine range, that is, between the third and fourth threshold values $U_E$ and $U_A$.

At a later time, for example at time $T_2$, a new set point is entered. This new set point (see pressure point B) is clearly lower than the previous set point (see pressure point A). As a result, the deviation is now much greater than the fourth threshold value $U_A$ and therefore falls into the third (coarse) range, with the result that window discriminator 10 now drives coarse discharge valve 17 in the direction of opening it. The pressure in servo drive 5' consequently drops rapidly, until the deviation falls below the fourth threshold value $U_A$, that is, once again into the fine range. Coarse valve 17 is closed when this threshold value is passed. On the other hand, fine valve 3' remains open in the sense of a small discharge of air from servo drive 5'. The pressure falls again to the value $B_u$. This means that—under the assumptions made at the beginning—the deviation constantly becomes smaller, reaches the value of zero and finally decreases to the second threshold value $-U_F$. When pressure point $B_u$ or the second threshold value $-U_F$ is reached at time $T_3$, fine valve 3' is opened once again in the direction of supplying air, and moreover until the upper pressure point $B_o$ is reached once again. A new cycle of microoscillations of pressure now commences about the new pressure point B. As long as the deviation remains in the fine range, only fine valve 3' remains in action and brings about the described microoscillations in pressure. In principle, a frequency can be assigned to these microoscillations, which can occur only under the initially made assumption of a disturbance-free control system, that does not correspond to reality. This frequency depends on the distance between the first and second threshold values $+U_F$ and $-U_F$, the effective flow cross section of fine valve 3' as well as on the nature of the consuming device (which, for example, shifts a large diaphragm or a pneumatic piston) and especially on the capacity of its operating air chamber and on the diameter of its operating membrane or its piston.

In reality, a control system, especially one whose servo drive is a fluidic pressure drive, does not react without delay to a change in the manipulated variable—in the example of the operation shown, to a change in the control signal supplied by lead 15' to fine valve 3'. The direction of the pressure change in servo drive 5' and especially the direction of the change in the deviation will therefore not be reversed suddenly when fine valve 3' is reversed, that is, when the first or second threshold value $+U_E$ or $-U_F$ is reached. On the contrary, a certain "overshoot" is to be expected. In order to reproduce these conditions, the pressure or deviation reversal points $A_o$ and $B_o$ would have to lie above the first threshold value $+U_F$ and $A_u$ and $B_u$ would have to lie below the second threshold value $-U_F$. This is taken into consideration in FIG. 3A.

Moreover, it must always be assumed that, in reality, (external) disturbances act on the control process—otherwise no control would be required. As a consequence of this, the instantaneous value—and therefore also the deviation—is acted upon not only by the previously described microflows of fluid through fine valve 3' (or fine valve 3 in addition to fine discharge restrictor 6) and the pressure changes initiated hereby in the servo drive 5' (or 5), but additionally also by (external) disturbances. Since the variation with time, especially the number, magnitude and direction of the disturbances, is not foreseeable and therefore generally is a stochastic function, the previously considered curve in reality shows neither a periodicity nor a constant amplitude in the stricter sense, that is, neither constant time intervals between adjacent passages through zero nor constant peak values. On the contrary, the course is not determinable. At best, it would be possible to speak of an average period or frequency and an average amplitude. In the following however, the expressions "average fluctuation frequency" and "average peak value" are used instead. For example, an actual curve of the deviations $x_w$ could have the course shown in FIG. 3B. The corresponding applies to the course of the pressure in the servo drive.

Experiments have shown that, with regard to the distance between the first and second threshold values $+U_F$ and $-U_F$ lying within the fine range, the best practical results were achieved with the finest setting of commercially available window discriminators. It was moreover found that the optimum ratio of the diameter of diaphragm surface to diameter of the opening of the fine valve lies between 50:1 and 300:1, the diameter of the valve opening being, for example, 1 mm.

On the basis of comparisons between the set point and instantaneous values, made within a very narrow range, the fine range, window discriminator 10 reverses fine valve 3' in rapid sequence, frequently, for example, already after only one tenth of a second. Consequently the reversing cycle has a comprarativaly high average fluctuation frequency f, for example, 5 fluctuations/second. It follows from what has been stated till now that a pressure fluctuation (transient pressure) is initiated within the fine range of the control circuit or, more accurately, in the servo drive 5 or 5'. Experiments have shown that such fluctuations do not interfere; on the contrary, they make it possible to achieve extremely accurate control with high sensitivity. Virtually any deviation of instantaneous value from set point is detected and appropriately controlled relatively early by means of the transient micropressures introduced in the servo drive. This is also the reason why transient micropressures do not result in a resonant increase of oscillations in the control circuit but, on the contrary, prevent such resonant increases.

Figure 4:
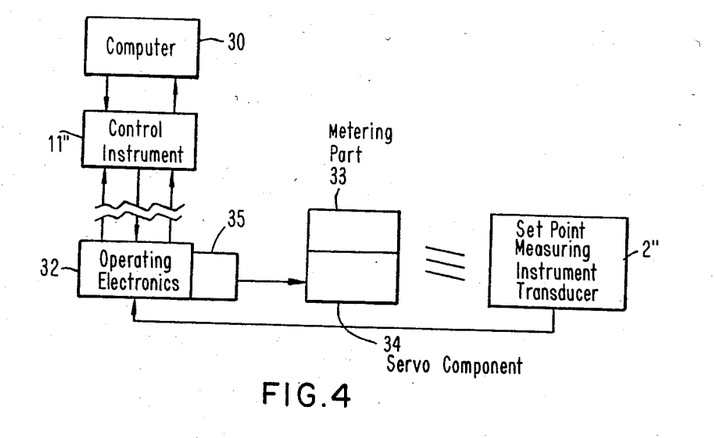
FIGS. 4 and 5 are applications of the control principle, illustrated by means of FIG. 2.

Applications of the control principle, explained in FIG. 2, are illustrated in FIGS. 4 and 5.

As shown in the Figures, a plant computer (30) enters the desired declared capacity, for example 24 tons per hour, in a control instrument 11". The plant computer continuously receives the instantaneous values by way of control instrument 11". These instantaneous values, as well as the quantity pulses, for example, one pulse per 10 kg, are added up in the plant computer 30 to form the total amount of a charge or other unit per time.

Control instrument 11" is connected directly with the operating electronics 32. The two instruments can be directly connected physically—or over an appropriate information lines up to 100 m long. For the case that no plant computer 30 is available, control instrument 11" has all the necessary operating elements and indicators, even for so-called manual operation. In principle, control instrument 11" can be switched over from computer operation to manual operation and vice versa.

The operating electronics 32 essentially comprise a controller/comparator unit 1" and may be connected structurally with an electro-pneumatic convertor 35, so that one kit or control instrument S is formed. The electro-pneumatic convertor 35 comprises the aforementioned valves 14, 3' and 17, as well as restrictors 20 and 21. The outputs of the electro-pneumatic convertor 35 control a servo component 34, which comprises a diaphragm drive as servo drive 5" and a sliding valve as servo element 40. Servo component 34, for its part, may in turn be structurally connected with metering part 33. Metering part 33 is shown symbolically in FIG. 5 by the discharge section of a grain container 38 together with discharge opening 39. Sliding valve 40 controls the cross section of the discharge opening 39.

Immediately after sliding valve 40, the freely falling stream of grain is deflected by means of a baffle 42. The force, so exerted on baffle 42, is converted by an instantaneous value sensor 2" in the form of a force transducer into a corresponding electrical, instantaneous value signal and amplified in amplifier 36, which is provided in the operating electronics 32. The instantaneous value signal is supplied, on the one hand, to the controller/comparator unit 1" and, on the other, to control instrument 11". In the example of the operation shown in FIG. 5, the control circuit was used for controlling grain dosage rate. The control circuit can also be used instead for metering water.

Figure 6:
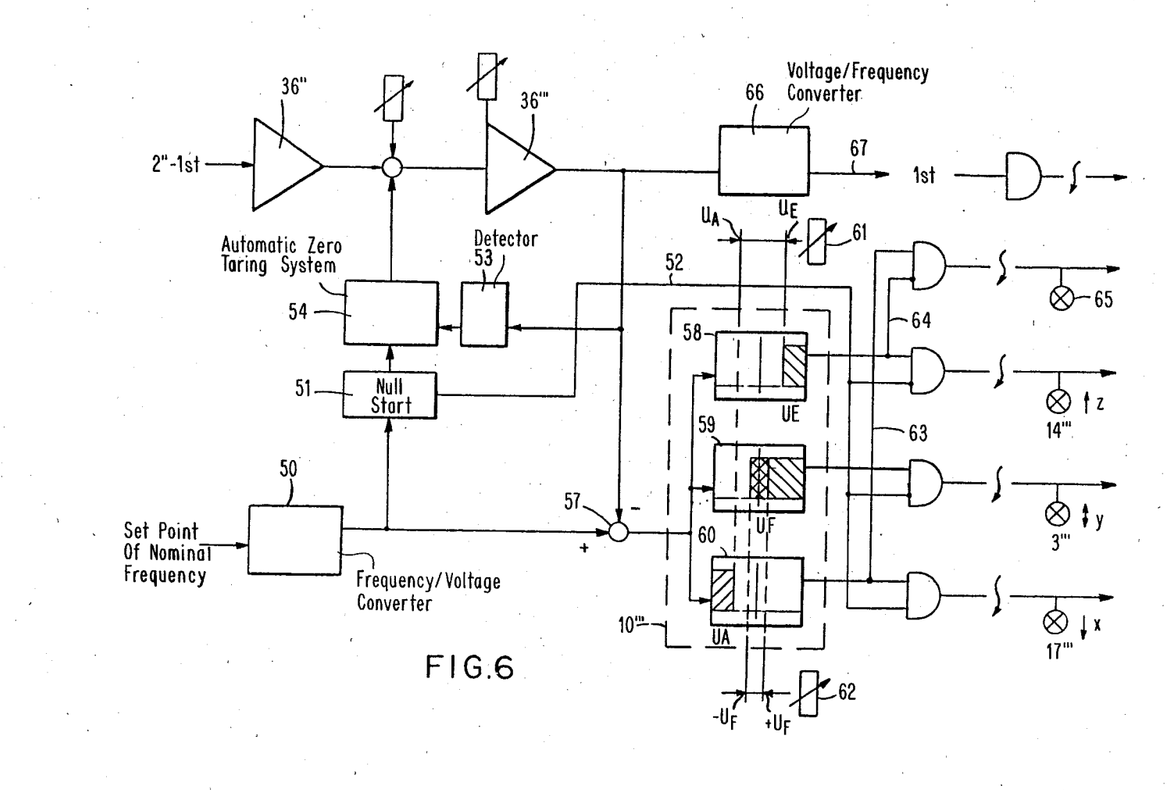
FIG. 6 is a circuit diagram of a form of construction of a part of the control circuit (operating electronics).

FIG. 6 schematically shows an example of the operation of a circuit diagram for the operating electronics 32. The supply voltage for the operating electronics 32 (usually) is 24 volts direct current. In the example of the operation shown, the set point is first of all supplied in the form of a nominal frequency to the operating electronics 32 and converted there, by means of a frequency/voltage convertor 50, into a set-point voltage. The set-point voltage can assume values between 0 and 10 volts. When the set value jumps from 0 to a specified voltage, a start signal is given by means of a zero starter 51. For a specified time, the start signal locks, by way of lead 52, the outlets of a fine valve 3''', of a coarse inlet valve 14''' and of a coarse discharge valve 17'''. At the same time, the control apparatus is automatically tared with the help of a zero-point detector 53 and an automatic zero taring system 54. The instantaneous tare force of the (still unstressed) force transducer 2" (FIG. 5) is determined over an amplifier 36 (FIG. 5) or a preamplifier 36" and the succeeding post-amplifier 36''' (FIG. 6). The instantaneous tare force, so determined, is stored as a corresponding electrical signal over zero-point detector 53 in the automatic zero taring system 54. After the zeroing is completed, for example, after one to two seconds, the valves are once again unlocked. The control circuit is now ready for its actual control function.

The preset set point is then compared in the comparator section of the controller/comparator unit 1" with the instantaneous value measured by the (now stressed) force transducer or instantaneous-value sensor 2". A summation point 57 is provided for this purpose. The difference between the instantaneous value and the set point, that is, the deviation, is supplied to a window discriminator 10'''. Because the deviation is still large at the start of the control, this window discriminator 10''' produces a second coarse discrimination signal Z for opening the coarse inlet valve 14'''. This coarse discrimination signal Z effects complete release of the outlet opening 39 over diaphragm 5" and over sliding valve 40 (FIG. 5), which is controlled by diaphragm 5".

As soon as the deviation has reached the third threshold value $U_E$, that is, the boundary between the coarse and fine ranges, a second threshold value switch 58 gives a coarse discrimination signal Z for closing coarse inlet valve 14'''. After this, the already-described control within the fine range commences. For this purpose, window discriminator 10''' has a first threshold value switch 59. This now gives a first fine discrimination signal Y to fine valve 3', this fine discrimination signal changing, that is, fine valve 3' reversing whenever the deviation has reached the first or the second threshold value $+U_F$ or $-U_F$.

If now a new set point is fixed, which is clearly lower than the first set point, then a third threshold value switch 60 commences to function and, over a third coarse discrimination signal X, causes coarse discharge valve 17''' to open or outlet opening 39 to close correspondingly rapidly by means of sliding valve 40.

It follows from the preceding that threshold values $U_E$ and $U_A$ of the second and third threshold value switches 58 and 60 correspond to a relatively large deviation from the summation point 57. The voltage threshold values $U_E$ and $U_A$, which in each case bring about a change in the coarse discrimination signals z and Y, are drawn symbolically in FIG. 6 in the second and third threshold value switches 58 and 60. In other words, when the deviation has a value above or below voltages $U_E$ or $U_A$ respectively, coarse discharge valve 17''' or coarse inlet valve 14''' is driven in the direction of the influx or discharge respectively of air. On the other hand, if the deviation has a voltage between voltages $U_E$ and $U_A$, then both coarse valves 14''' and 17''' are closed and only fine valve 3' is used for controlling in such a way, that it is continuously reversed by means of fine discrimination signal Y and, through this, initiates transient micropressure in servo drive 5'.

The control behavior in the coarse ranges as well as in the fine range is determined in each case by balancing the threshold values or the corresponding switching points.

The switching points or the third and fourth threshold voltages $U_E$ and $U_A$ for the deviations are synchronously preselectable through a potentiometer 61 and the first and second threshold voltages $+U_F$ through potentiometer 62.

When the control apparatus is operating in the fine range and the deviation is between $U_E$ and $U_A$, an operating signal is formed. An AND element, which links the signals on leads 63 and 64, is provided for this purpose. This operating signal can be made visible by means of the control instrument 11'', the computer 30 or a light.

Moreover, the voltage of the instantaneous value signal is converted into a corresponding frequency by means of a voltage frequency converter 66, as shown in FIG. 6. This frequency signal can be used over lead 67 for indicating the quantity pulses or for determining the corresponding product output during a specified time.

Figure 7:
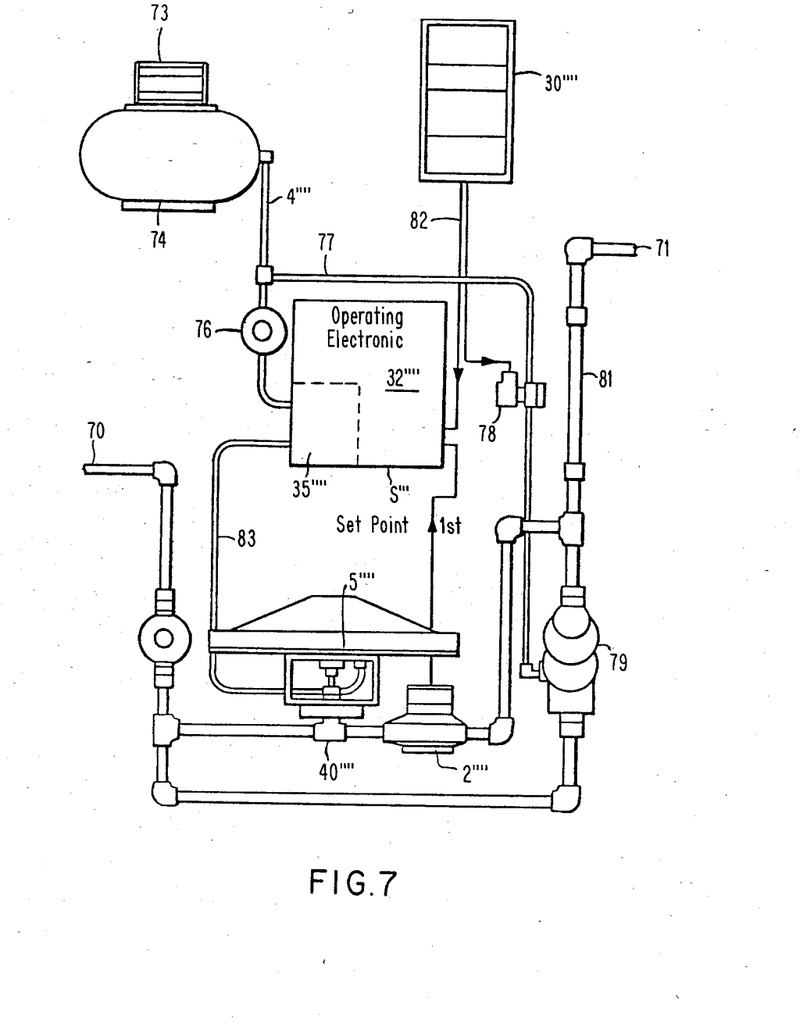
FIG. 7 is a further form of construction for controlling the dosage rate of water.

A further example of the operation of the invention for controlling the dosage rate of an amount of water is shown in FIG. 7. In the example of the operation shown, water is taken from the water mains system through pipeline 70 and supplied to a final consumer over pipeline 71. Reference is made to the preceding example of the operation in order to avoid repeating the details of the control system.

The control apparatus is switched on with a control instrument or computer 30''''. By so doing, compressor 73, which supplies compressed air to a tank 74, is switched on at the same time. Tank 74 is connected by feed line 4'''' with an electro-pneumatic convertor 35''''. The latter controls a servo drive 5'''' over pipeline 83.

In particular, an air filter 76 is connected between tank 74 and a control instrument S''''. The controller/comparator unit 1'' as well as the already-mentioned electro-pneumatic converter 34'''' are located in the control instrument S''''. The electro-pneumatic convertor 34'''' in turn contains the eletro-pneumatic valves 3', 14' and 17'.

The example of the operation, shown in FIG. 7, also has a device for uncoupling the control circuit from the water supply control system, for example, in the case of a defect in the control circuit or when service work is necessary. An additional electro-pneumatic valve 78, which controls the air flow in pipeline 77, is provided for the then possible manual operation. A water sluice valve 79 can be opened by appropriately controlling electro-pneumatic valve 78. For manual operation, the amount of water can be read at a water pipe 81.

In normal control operation, the electro-pneumatic valve 78 is so controlled that water sluice valve 79 is closed. In this case, the amount of water flowing is read at an instantaneous value sensor 2'''', which is constructed as a water flow counter. For control operations, the desired set point of water flow is set over pipeline 82 at control instrument S'''' or at the controller/comparator unit 1''. The controller, comparator unit 1'' now controls the electro-pneumatic converter unit 35'''' which, over pipeline 83, controls the pneumatic activation of servo drive 5'''', which is constructed as a diaphragm drive. The diaphragm of servo drive 5'''' has a relatively large diameter, for example, a diameter of 10 to 14 cm, so that a very large force is available for displacing servo element 40'', which is an adjusting stopcock here. The water flow counter is mounted immediately after adjusting stopcock 40'', which functionally corresponds to sliding valve 40 in FIG. 5. Over an appropriate electronic system, the water flow counter gives a signal, which corresponds to the (present) instantaneous value. As already explained, the instantaneous value is compared in the controller/comparator unit 1'' with the set point. Discrimination or servo signals are then derived in the described manner from the deviation resulting from such a comparison. As for the rest, the instantaneous value can simultaneously be evaluated in the computer as operating data for determining a certain amount of water in a unit of time.

Figure 8:
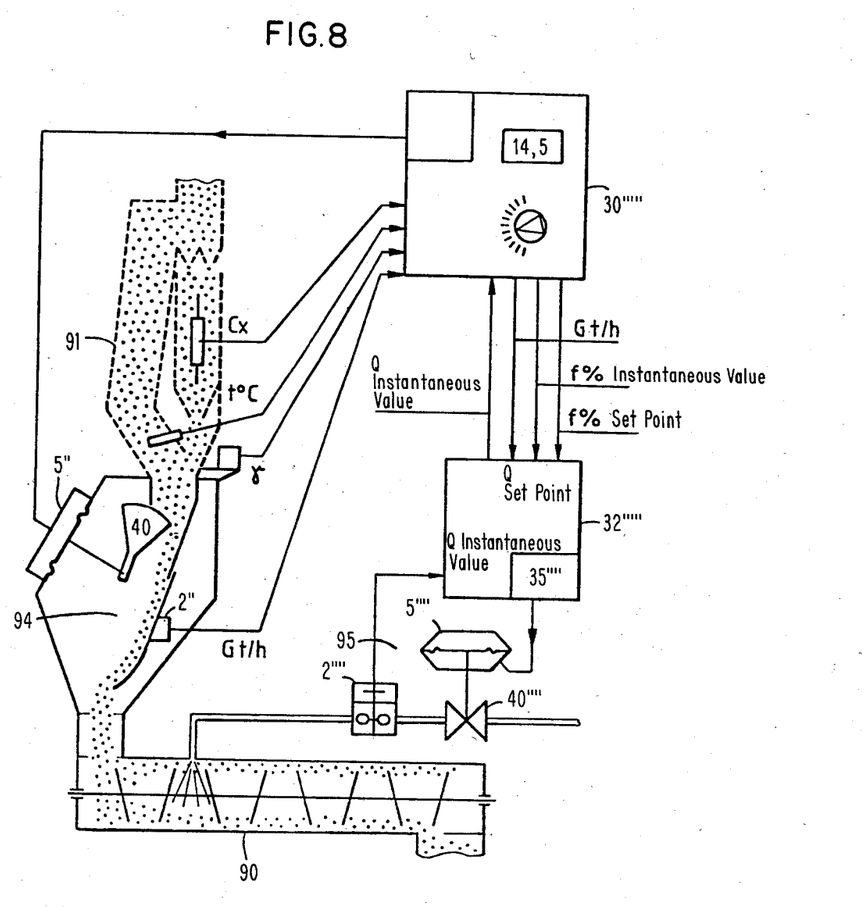
FIG. 8 is an embodiment of the invention for simultaneously controlling the dosage rates of grain and water.

Linking the examples of the operation, shown in FIGS. 5 and 7, to a grain network plant, that is, a plant for moistening grain, is shown in FIG. 8. The explanations, given in connection with FIGS. 5 and 7, fully apply here. Water can be metered accurately and without fluctuations to a continuously flowing stream of grain only if both systems, that is, the system for metering the grain and the system for metering the water, are correspondingly accurate and free of resonant increases in oscillations. By linking the two systems, as shown schematically in FIG. 8, it was possible, for the first time, to completely solve a problem, which had remained unsolved in flour milling for a long time. The elegance of the new solution is shown here in a convincing manner by the combination of two inventively constructed control apparatuses.

The precise, continuously metering of a liquid to a continuous, precisely meterable flow of grain now also permits the use of vary rapidly operating, so-called flow-intensive network equipment 90.

This particularly advantageous solution comprises the continuous measurement and control of the flow of grain as well as the continuous measurement and control of the dosage rate of a liquid to the grain. Intensive and immediate mixing of these two components, namely grain and liquid, then takes place in the intensive network equipment 90. The two control devices are coordinated by a computer 30'''''.

The initial moisture content of the grain can be measured in a moisture measuring section 91 (broken line). The computer 30'''' determines from temperature t a factor $\gamma$, which is proportional to the bulk density, and, from an electrical capacitance value $C_x$ the relative moisture content of the grain and compares this moisture content with the desired moisture content. On the basis of this data and the flow rate signal Gt/h, measured by instantaneous value sensor 2''', the desired value Q for the amount of water to be added is calculated by computer 30''''' and preset in the operating electronics 32''''. An instantaneous value sensor for liquid flow determines the instantaneous value of the amount of water supplied. The desired value is then compared with the instantaneous value in the operating electronics 32''''. The servo signal, derived from the resulting deviation, is then supplied to the servo drive S'''', which controls a servo element 40'''' constructed as a water feed valve (e.g. slide valve).

In a further variant, or silo or storage cell can be used directly instead of measuring section 91. In this case, the desired, percentage moisture increase is preset.

We claim:

1. Process for controlling a controllable magnitude for throughput control of a pourable or fluid material through a feed line, comprising setting a predetermined value for the controllable magnitude, sensing the instantaneous value of the controllable magnitude as a function of throughput of said material in said feed line, comparing the set predetermined value with said instantaneous value to determine the amount and direction of deviation between said instantaneous and predetermined values, dividing the deviations thus determined into three ranges, namely a fine range having upper and lower limits and within which lies first and second threshold values, an upper coarse range exceeding the upper limit of the fine range and a lower coarse range exceeding the lower limit of the fine range, introducing fluid to or discharging fluid from a fluidic pressure drive via a fine control valve, when said deviation is in the fine range thereof, until the first or second threshold values is reached, reversing fluid flow whenever said deviation has reached said first or second threshold values, and for deviations in the upper and lower coarse ranges introducing fluid to or discharging from said fluidic pressure drive via a coarse discharge valve or a coarse inlet valve when said deviations are in the coarse ranges thereof.

2. The process of claim 1, wherein for deviations in the fine range a first microflow of fluid is continuously introduced into the fluidic pressure drive and a second microflow of fluid, in an amount greater than the first microflow of fluid, is discharged from the fluidic pressure drive when the deviation reaches said first, upper, threshold value, said fluid discharge being maintained until the deviation falls to said second, lower, threshold value.

3. The process of claim 1, wherein for deviations in the fine range a first microflow of fluid is constantly discharged from the fluidic pressure drive and a second microflow of fluid, in an amount greater than the first microflow of fluid, is introduced into the fluidic pressure drive when the deviation reaches said second, lower, threshold value, the supply of fluid being maintained until the deviation rises to said first, upper, threshold value.

4. The process of claim 1, wherein for deviations in the fine range, a microflow of fluid is introduced into or discharged from the fluidic pressure drive, the direction of fluid flow being reversed when the deviation reaches said first, upper, or the second, lower, threshold value.

5. The process of claim 1, wherein the instantaneous value of the controllable magnitude is sensed by a sensor which transforms pneumatic to electrical signals, the set predetermined value being an electrical quantity compared in an electrically operated comparator with said instantaneous value in form of an electrical signal thereby to provide an indication of said deviation in form of an electrical signal.

6. The process of claim 1, wherein the fluid for deviations in the fine and coarse ranges thereof has an average fluctuation frequency of about 1 to 50 fluctuations per second.

7. The process as defined in claim 1, wherein the fluid introduced for deviations in said fine and coarses ranges thereof has an average fluctuation frequency of about 5 to 20 fluctuations per second.

8. The process of claim 1, wherein an electronic discriminator divides said deviations into said three ranges, said first and second threshold values being defined by two discrete values within the fine range of deviations and one value, proportional to the deviation, being selected in the coarse deviation ranges for increasing or lowering the pressure in the fluidic pressure drive.

9. The process of claim 1, wherein it is used for continuously controlling the dosage rate of a falling stream of grain in a flour mill.

10. The process of claim 1, wherein it is used for continuously controlling the dosage rate of water supplied to grain in a flour mill.

11. Apparatus for controlling a controllable magnitude for throughput control of pourable or fluid material through a feed line, a set point adjustment means for setting a predetermined value for the controllable magnitude, instantaneous value sensor means for sensing the instantaneous value of the controllable magnitude as a function of throughput of said material in said feed line, comparator means forming part of a controller unit including a discriminator and a fluidic pressure drive, said comparator means being supplied with said set predetermined value and said instantaneous value of said controllable magnitude and supplying at its output, as a resultant determination, the amount and direction of deviations between said instantaneous and predetermined value, said discriminator being supplied with the output of said comparator means for dividing the deviations into three ranges, namely a fine range having upper and lower limits and within which lies first and second threshold values, an upper coarse range exceeding the upper limit of the fine range and a lower course range exceeding the lower limit of the fine range, and means operatively connected with said discriminator for introducing to or discharging fluid from said fluidic pressure drive in an amount functionally related to each of said deviation ranges.

12. Apparatus according to claim 11, wherein said last-named means comprises a fine control valve, a coarse inlet valve and a coarse discharge valve, the arrangement being such that fluid is introduced to or discharged from the fluidic pressure drive via said fine control valve, when said deviations are in said fine range thereof, until said first or said second threshold value is reached whereat fluid flow is reversed, reversal occurring each time said deviations attain said first or said second threshold values, fluid being introduced to or discharged from said fluid pressure drive via said coarse discharge valve or said coarse inlet valve when said deviations are in the coarse ranges thereof.

13. The apparatus of claim 12, wherein the set-point adjustment means, the instantaneous value sensor means and the controller unit including the comparator means and the discriminator are electrical components.

14. The apparatus of claim 13, wherein the valves of the last-named means has an effective flow cross section sufficiently small, so that the flow of fluid through it, has substantially no effect on the pressure in the fluidic pressure drive.

15. The apparatus of claim 14, wherein the valves of the last-named means comprise electromagnetic control valves.

16. The apparatus of claim 15, wherein the fine control valve is a three-way valve.

17. The apparatus of claim 16, wherein the effective flow cross section of the three-way valve is at most equal to $\pi/4$.

18. The apparatus of claim 14, wherein the fine control valve has two effective flow cross sections of different size.

19. The apparatus of claim 18, wherein the smaller flow cross section is open permanently and the larger flow cross section is open only when operated under control of a first threshold switch of the discriminator, the first threshold switch being connected to provide a control signal when the deviation reaches said first or said second threshold value.

20. The apparatus of claim 15, wherein the fine control valve is a two-way valve, a flow-restrictor being included in the fluid flow path to the fluidic pressure drive and having a smaller effective flow cross section than the two-way valve.

21. The apparatus of claim 11, wherein the discriminator comprises a window discriminator providing second and third discrimination signals for deviations in said lower and upper coarse ranges, said second and third discrimination signals effecting operation of said coarse inlet valve and said coarse discharge valve respectively, said valves being designed for fluid influx or discharge proportional to the deviation.

22. The apparatus of claim 21, wherein the fine control valve and said coarse inlet and discharge valves are fluidically connected in parallel.

23. The apparatus of claim 21, wherein an adjustable coarse restrictor is connected between the fluidic pressure drive and said fine control valve with which said inlet and coarse discharge valves are fluidically connected in parallel.

24. The apparatus of claim 21, wherein an adjustable fine restrictor is connected in series with the fine control valve.

* * * * *